United States Patent
Hsu et al.

(10) Patent No.: US 9,665,225 B2
(45) Date of Patent: May 30, 2017

(54) TOUCH DISPLAY DEVICE (71) Applicant: TPK Touch Solutions (Xiamen) Inc., Xiamen (CN)

(72) Inventors: I-Chung Hsu, Taipei (TW); Kuo-Shu Hsu, Xinbei (TW); Fenghua Lu, Xiamen (TW); Chenghong Xu, Shangrao (CN)

(*) Notice: Subject to any disclaimer, the term of this patent is extended or adjusted under 35 U.S.C. 154(b) by 0 days.

(21) Appl. No.: 14/742,698

(22) Filed: Jun. 17, 2015

(65) Prior Publication Data
US 2015/0370382 A1 Dec. 24, 2015

(30) Foreign Application Priority Data

Jun. 19, 2014 (CN) .......................... 2014 1 0274647

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

| | | | | |
|---|---|---|---|---|
| 6,842,288 B1* | 1/2005 | Liu | ........................ | G02B 1/111 359/582 |
| 8,520,169 B2* | 8/2013 | Kitagawa | .............. | B29C 55/026 349/96 |
| 9,298,291 B2* | 3/2016 | Jeon | ........................ | G06F 3/041 |
| 9,372,586 B2* | 6/2016 | Chen | ........................ | G06F 3/044 |
| 2008/0062148 A1* | 3/2008 | Hotelling | ............ | G02F 1/13338 345/174 |
| 2013/0120283 A1* | 5/2013 | Tung | ........................ | B32B 37/12 345/173 |
| 2013/0323521 A1* | 12/2013 | Xia | ........................ | C09J 133/08 428/523 |
| 2014/0104185 A1* | 4/2014 | Hu | ........................ | G06F 3/041 345/173 |
| 2015/0169121 A1* | 6/2015 | Yao | ........................ | G06F 3/044 345/174 |

* cited by examiner

*Primary Examiner* — Seokyun Moon (57) ABSTRACT

A touch display device comprises a display module, a polarizer, a first patterned electrode layer and a first transparent adhesive layer. The first patterned electrode layer is disposed between the polarizer and the display module and includes a patterned portion and a non-patterned portion. The first transparent adhesive layer is disposed on the first patterned electrode layer. The refractive index of the first transparent adhesive layer is greater than or equal to 1.65 and less than or equal to 1.72, wherein reflectivity of the patterned portion is substantially the same as reflectivity of the non-patterned portion.

20 Claims, 6 Drawing Sheets

TOUCH DISPLAY DEVICE

BACKGROUND OF THE DISCLOSURE

This Non-provisional application claims priority under 35 U.S.C. §119(a) to Chinese on Patent Application No. 201410274647.3 filed in the People's Republic of China on Jun. 19, 2014, the entire contents of which are hereby incorporated by reference.

FIELD OF THE INVENTION

This disclosure relates to touch technology and more particularly, to touch display devices.

DESCRIPTION OF THE RELATED ART

As technology progresses, touch display devices are being applied in new products at a rapid clip. Current applications of the touch display device include portable electronic products (e.g., tablet computers, cell phones, and digital cameras), commercial products (e.g., automated teller machines, and remote video conferencing) and public information applications (e.g., airport kiosks, station guides, and data querying).

A touch display device includes a touch panel and a display panel which are attached to each other. The touch panel includes an electrode layer used for touch sensing. The electrode layer is usually a patterned electrode layer formed by etching a whole conductive layer. Because the electrode layer has a region with electrodes (i.e., the patterned portion) and another region without electrode (i.e. the non-patterned portion) and these two regions have different refractive indexes, the electrode pattern may be visible and the appearance of the touch display device is degraded.

SUMMARY OF THE DISCLOSURE

In view of the foregoing problem, the present disclosure provides a touch display device whereby the problem that the electrode pattern of the touch display device is visible and the technical complexity can be solved.

A touch display device according to this disclosure comprises a display module, a polarizer, a first patterned electrode layer and a first transparent adhesive layer. The first patterned electrode layer is disposed between the polarizer and the display module and includes a patterned portion and a non-patterned portion. The first transparent adhesive layer is disposed on the first patterned electrode layer. The refractive index of the first transparent adhesive layer is greater than or equal to 1.65 and less than or equal to 1.72, wherein reflectivity of the patterned portion is substantially the same as reflectivity of the non-patterned portion.

In some embodiments, the first transparent adhesive layer is disposed between the first patterned electrode layer and the display module.

In some embodiments, the first transparent adhesive layer has a first surface and a second surface which are disposed oppositely, the first surface faces the first patterned electrode layer and the second surface faces the display module, the refractive index of the first surface is greater than that of the second surface, and the stickiness of the second surface is greater than that of the first surface.

In some embodiments, the touch display device further comprises a refractive-index matching layer disposed between the polarizer and the first patterned electrode layer.

In some embodiments, the first transparent adhesive layer is disposed between the polarizer and the first patterned electrode layer.

In some embodiments, the first transparent adhesive layer has a first surface and a second surface which are disposed oppositely, the first surface faces the polarizer and the second surface faces the first patterned electrode layer, the refractive index of the second surface is greater than that of the first surface, and the stickiness of the first surface is greater than that of the second surface.

In some embodiments, the touch display device further comprises a refractive-index matching layer disposed between the display module and the first patterned electrode layer.

In some embodiments, at least a covering layer is disposed on the polarizer and in a peripheral region of the polarizer.

In some embodiments, the touch display device further comprises a protection substrate disposed on the side of the polarizer away from the display module.

In some embodiments, a second transparent adhesive layer is disposed between the protection substrate and the polarizer.

In some embodiments, the second transparent adhesive layer has a third surface and a fourth surface which are disposed oppositely, the third surface faces the protection substrate and the fourth surface faces the polarizer, the refractive index of the fourth surface is greater than that of the third surface, and the stickiness of the third surface is greater than that of the fourth surface.

In some embodiments, at least a covering layer is disposed on the protection substrate and in a peripheral region of the protection substrate.

In some embodiments, the thickness of the first transparent adhesive layer is in a range between 150 µm and 200 µm.

In some embodiments, the touch display device further comprises a second patterned electrode layer disposed on the polarizer and between the protection substrate and the polarizer, and crossing the first patterned electrode layer.

As mentioned above, in the touch display device of this disclosure, the patterned electrode layer is integrated with the display panel so that an additional glass substrate for carrying the patterned electrode layer can be omitted and the thickness of the touch display device can be reduced. Besides, the polarizer and the display module are attached together by the first transparent adhesive layer of high refractive index. Accordingly, the first transparent adhesive layer not only provides the adhesion effect, but also makes the electrode pattern of the touch display device less visible or even invisible by its particular high refractive index. Therefore, the appearance effect of the touch display device is improved, and besides, the multi-layer optical film (or a plurality of optical films) of the conventional art is reduced so that the touch display device can be made lighter and thinner and the manufacturing method can be simplified.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

To be noted, the terms of "on" and "below" or "up" and "down" in the following illustration are just for showing the relative position of the elements. Besides, the case where a first element is formed on, above, over, below or under a second element can include the following meanings. That is, the first element can directly contact the second element, or an additional element is disposed between the first element and the second element, so that the first element and the second element are without the direct contact.

Figure 1A:
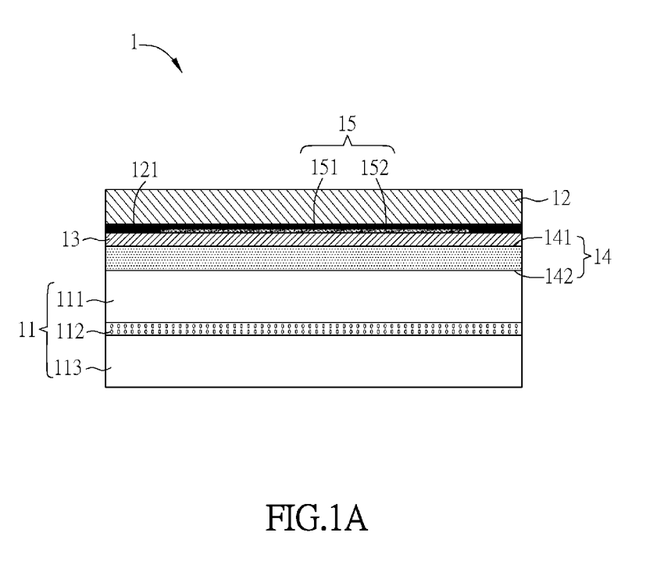
FIG. 1A is a schematic sectional diagram of a touch display device in accordance with one embodiment of the disclosure.

FIG. 1A is a schematic sectional diagram of a touch display device in accordance with various embodiments of the disclosure. As shown in FIG. 1A, the touch display device 1 includes a display module 1, a polarizer 12, a first patterned electrode layer 13 and a first transparent adhesive layer 14. The touch display device 1 can be applied to a touch system, an interactive advertisement system, a hypermarket preferential ordering system, an access identification system, an information query system, a withdrawal system or a portable mobile device, but this disclosure is not limited thereto.

The display module 11 is a liquid crystal display (LCD) module (LCM) and includes a substrate 111, a liquid crystal layer 112 and a thin film transistor (TFT) substrate 113. Herein, the substrate is a color filter (CF) substrate. The substrate 111 is disposed opposite the TFT substrate 113, and the liquid crystal layer 112 is disposed between the substrate 111 and the TFT substrate 113. However, in some embodiments, the display module 11 may be a light emitting diode (LED) display module or an organic light emitting diode (OLED) display module for example, and the inner structure and composition thereof can include an LED layer or an OLED layer to replace the liquid crystal layer 112.

The polarizer 12 is disposed opposite the display module 11. Furthermore, the polarizer 12 is disposed over the substrate 111 of the display module 11, i.e. on the side away from the liquid crystal layer 112. Moreover, the polarizer 12 includes a PET film or TAC film, but this disclosure is not limited thereto. The polarizer 12 serves as the cover glass of the touch display device 1, and the side of the polarizer 12 away from the substrate 111 is touched or operated by the user. Besides, some functional layers, such as an anti-glare layer, anti-fingerprint layer or anti-reflection layer, can be disposed on the polarizer 12.

The first patterned electrode layer 13 is disposed between the polarizer 12 and the display module 11. The first patterned electrode layer 13 is disposed on the polarizer 12. Furthermore, the first patterned electrode layer 13 is disposed on the side of the polarizer 12 facing the display module 11, i.e. under the polarizer 12. Since the first patterned electrode layer 13 is formed on the polarizer 12 which acts as the attachment or carrying element of the first patterned electrode layer 13, the glass substrate whereto the patterned electrode layer in the conventional art is attached can be omitted and therefore the entire thickness of the touch display device 1 can be reduced. The first patterned electrode layer 13 is formed by deposition, exposure, development, etching or the like. Furthermore, the first patterned electrode layer 13 includes the uniaxial touch electrode (such as a comb-shaped electrode) or biaxial touch electrode (such as two axial electrodes crossing each other), and the biaxial electrode is illustrated here for example but this disclosure is not limited thereto.

Figure 1B:
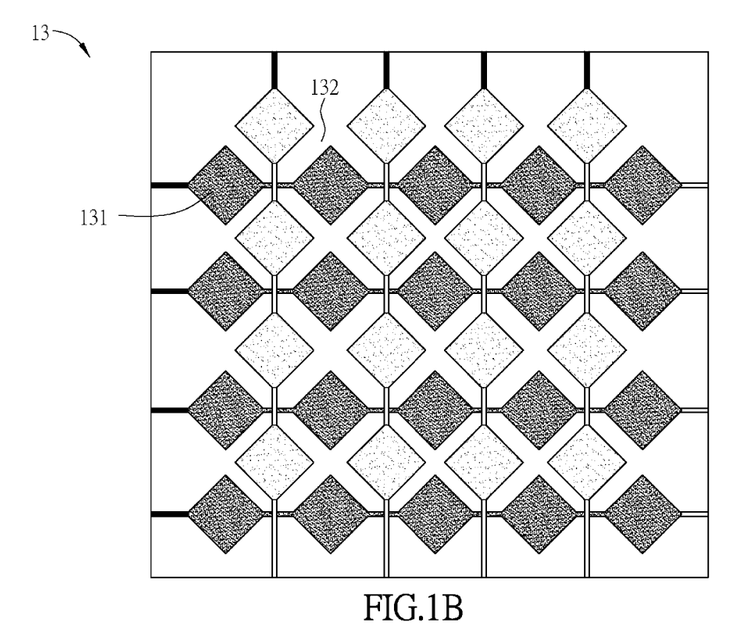
FIG. 1B is a schematic top view of the first patterned electrode layer in FIG. 1A.

FIG. 1B is a schematic top view of the first patterned electrode layer in FIG. 1A. As shown in FIG. 1B, the first patterned electrode layer 13 includes a patterned portion 131 and a non-patterned portion 132. The patterned portion 131 is the portion of the above-mentioned touch electrode, which can be, for example, the combination of a plurality of blocks or strips, and the blocks are given as an example here. The non-patterned portion 132 is the portion excluding the touch electrode and mainly includes the region between the block-shaped touch electrodes in this embodiment. In the case without the first transparent adhesive layer 14, since the patterned portion 131 has the conductive material with the refractive index mainly of the touch electrode and the non-patterned portion 132 is without the conductive material so as to have the refractive index of the polarizer 12, the refractive indexes of the patterned portion 131 and non-patterned portion 132 are different. Accordingly, because the patterned portion 131 and the non-patterned portion 132 are differ significantly in reflectivity and the optical density of the patterned portion 131 is higher, i.e. less pervious to light, the user will easily view the patterned portion 131 of the first patterned electrode layer 13 when the external light reaches the first patterned electrode layer 13 through the polarizer 12 and is then reflected to the outside through the first patterned electrode layer 13.

In the downward view from the touch display surface, i.e. from the top of the polarizer 12, the first patterned electrode layer 13 is disposed under the polarizer 12. Since the transparence of the polarizer 12 is lower than that of the normal transparent substrate, the visibility of the patterned portion 131 of the first patterned electrode layer 13 can be reduced and therefore the appearance effect of the touch display device can be enhanced. Otherwise, when the first patterned electrode layer 13 includes some opaque or highly reflective elements, such as metal bridging structure, metal nano-wires or metal mesh, the polarizer 12 further reduces the visibility of those elements and therefore the appearance effect of the touch display device is enhanced.

As shown in FIG. 1A and FIG. 1B, the first transparent adhesive layer 14 is disposed on the first patterned electrode layer 13. The first transparent adhesive layer 14 is disposed between the first patterned electrode layer 13 and the display module 11 to connect the polarizer 12 with the display module 11. The first transparent adhesive layer 14 is different from the normal optically clear adhesive (OCA), which has the refractive index similar to the glass in a range about between 1.48 and 1.5 and only functions for the adhesion. However, the first transparent adhesive layer 14 of this disclosure, in comparison with the normal OCA, has a higher refractive index, which is favorably greater than or equal to 1.65 and less than or equal to 1.72, so that the patterned portion 131 and the non-patterned portion 132 have the same reflectivity. Favorably, the reflectivities of the patterned portion 131 and non-patterned portion 132 are identical or the same basically, and that is, the difference of the reflectivities for the visible light between the patterned portion 131 and the non-patterned portion 132 is reduced. Thereby, the visibility of the patterned portion 131 is effectively reduced and the appearance effect of the touch display device can be thus improved.

Particularly, the first transparent adhesive layer 14 has a first surface 141 and a second surface 142 which are disposed oppositely. The first surface 141 faces the first patterned electrode layer 13 and the second surface 142 faces the display module 11. The refractive index of the first surface 141 is greater than that of the second surface 142, and the stickiness of the second surface 142 is greater than that of the first surface 141. In other words, the higher refractive index, which is greater than or equal to 1.65 and less than or equal to 1.72 and favorably 1.68 for the light of 550 nm wavelength, of the first surface 141 of the first transparent adhesive layer 14 reduces the visibility of the patterned portion 131 of the first patterned electrode layer 13, and the higher stickiness of the second surface 142 aids the connection of the polarizer 12 and display module 11. The thickness of the first transparent adhesive layer 14 is in a range between 150 μm and 200 μm, and thereby, the disposition of the first transparent adhesive layer 14 between the polarizer 12 and the display module 11 can both connect the polarizer 12 with the display module 11 and reduce the visibility of the patterned portion 131.

In some embodiments, the touch display device 1 further includes a refractive-index matching layer 15 which is disposed on the side of the polarizer 12 facing the display module 11. The refractive-index matching layer 15 is disposed between the polarizer 12 and the first patterned electrode layer 13 and is a single-layer or multi-layer structure. Besides, the refractive index and thickness of the refractive-index matching layer 15 can be adjusted according to the refractive index (N value) and extinction coefficient (K value) of the first patterned electrode layer 13 and the refractive index and thickness of the first transparent adhesive layer 14, so as to further reduce the visibility of the patterned portion 131. For example, the refractive index of the patterned portion 131 of the first patterned electrode layer 13 is in a range between 1.48 and 2.03, the extinction coefficient of the patterned portion 131 of the first patterned electrode layer 13 is in a range between 0.006 and 0.55, the refractive index of the first transparent adhesive layer 14 is in a range between 1.65 and 1.72, and the thickness of the first transparent adhesive layer 14 is in a range between 150 μm and 200 μm. In this embodiment, the refractive-index matching layer 15 includes a first refractive-index matching layer 151 and a second refractive-index matching layer 152. The first refractive-index matching layer 151 is disposed between the polarizer 12 and the second refractive-index matching layer 152, and the second refractive-index matching layer 152 is disposed between the first patterned electrode layer 13 and the first refractive-index matching layer 151. The material of the first refractive-index matching layer 151 is, for example but not limited to, $Nb_2O_5$, and the material of the second refractive-index matching layer 152 is, for example but not limited to, $SiO_2$. The thickness of the first refractive-index matching layer 151 is in a range between 4 nm and 20 nm, and the refractive index thereof is in a range between 2.0 and 2.5. The thickness of the second refractive-index matching layer 152 is in a range between 20 nm and 60 nm, and the refractive index thereof is in a range between 1.3 and 1.6. Thereby, the refractive-index matching layer 15, the first patterned electrode layer 13 and the first transparent adhesive layer 14 are used for matching the refractive index, and also the difference of the reflectivities between the patterned portion 131 and non-patterned portion 132 of the first patterned electrode layer 13 is minimized.

At least a covering layer 121 is disposed on the polarizer 12 and in the peripheral region of the polarizer 121. The covering layer 121 covers the wires (not shown) connecting the first patterned electrode layer 13, or covers the circuit board (not shown), or covers other electronic elements. Herein for example, the covering layer 121 includes the light-blocking material of higher optical density, such as ink, photoresist material or their combination. To be noted, in the peripheral region, the covering layer 121 is disposed between the first patterned electrode layer 13 and the polarizer 12, and correspondingly, the refractive-index matching layer 15 is only disposed in the middle region of the touch display device 1. In some embodiments, the refractive-index matching layer 15 may be extended to cover the covering layer 121 so that the covering layer 121 in the peripheral region can be disposed between the polarizer 12 and the refractive-index matching layer 15, or the portion of the refractive-index matching layer 15 in the peripheral region can be disposed between the covering layer 121 and the polarizer 12.

Figure 1C:
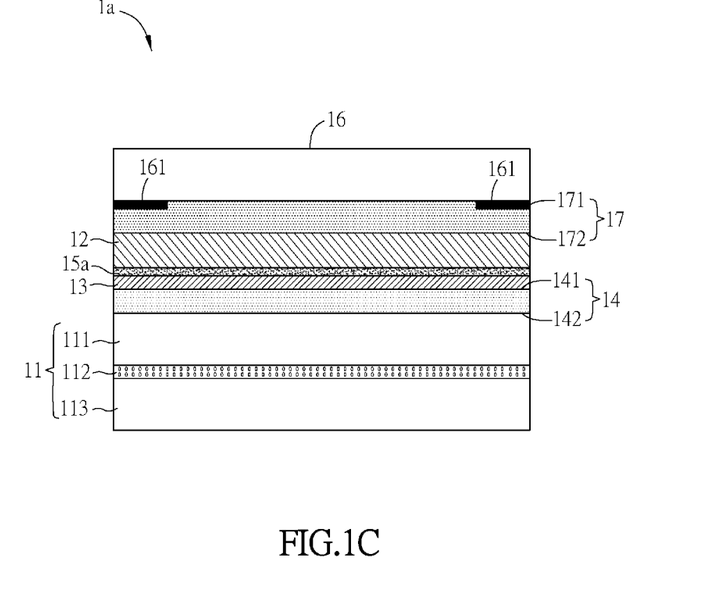
FIG. 1C is a schematic sectional diagram of another touch display device in accordance with one embodiment of the disclosure.

FIG. 1C is a schematic sectional diagram of another touch display device in accordance with various embodiments of the disclosure. As shown in FIG. 1C, the touch display device 1a further includes a protection substrate 16 which is disposed on the side of the polarizer 12 away from the display module 11, i.e. the top of the polarizer 12. The protection substrate 16 can be a glass substrate, plastic substrate or sapphire substrate. The protection substrate 16 also can be a strengthened substrate where the six surfaces thereof are chemically strengthened or only the upper and lower surfaces are chemically strengthened and the side surfaces are physically strengthened. The protection substrate 16 possesses the transparence and can prevent the inner structure of touch display device 1a from being damaged when the user presses the touch display device 1a. Besides, some functional layers, such as an anti-glare layer, anti-fingerprint layer or anti-reflection layer, are disposed on the protection substrate 16.

A second transparent adhesive layer 17 is disposed between the protection substrate 16 and the polarizer 12. The protection substrate 16 is attached to the polarizer 12 by the second transparent adhesive layer 17. The second transparent adhesive layer 17 is a transparent optical adhesive, such as OCA, mainly for the connection of the protection substrate 16 and polarizer 12.

In some embodiments, the second transparent adhesive layer 17 uses the same material as the first transparent adhesive layer 14, and the refractive index thereof is greater than or equal to 1.65 and less than or equal to 1.72 to further reduce the difference of the reflectivity between the patterned portion 131 and the non-patterned portion 132. Particularly, the second transparent adhesive layer 17 has a third surface 171 and a fourth surface 172 which are disposed oppositely. The third surface 171 faces the protection substrate 16 and the fourth surface 172 faces the polarizer 12. The refractive index of the fourth surface 172 is greater than that of the third surface 171, and the stickiness of the third surface 171 is greater than that of the fourth surface 172. Likewise, the higher refractive index of the fourth surface 172 of the second transparent adhesive layer 17 reduces the visibility of the patterned portion 131 of the first patterned electrode layer 13, and the higher stickiness of the third surface 171 aids connection of the protection substrate 16 and polarizer 12. Moreover, the refractive index and features of the second transparent adhesive layer 17 can be comprehended by referring to the above-mentioned first transparent adhesive layer 14, and therefore the related illustration is omitted here for conciseness.

In some embodiments, at least a covering layer 161 is disposed on the protection substrate 16 and in the peripheral region of the protection substrate 16. The covering layer 161 covers the wires (not shown) connecting the first patterned electrode layer 13, or covers the circuit board (not shown), or covers other electronic elements. Herein for example, the covering layer 161 includes the light-blocking material of higher optical density, such as ink, photoresist material or their combination.

In some embodiments, the refractive-index matching layer 15a is also disposed between the polarizer 12 and the first patterned electrode layer 13. The main difference from the above embodiment is that because the covering layer 161 is disposed on the protection substrate 16 instead of the polarizer 12, the first patterned electrode layer 13 is more evenly disposed on the polarizer 12 or refractive-index matching layer 15a without crossing the height difference of the covering layer 161. Herein, the refractive-index matching layer 15a, the first patterned electrode layer 13, the first transparent adhesive layer 14 and the second transparent adhesive layer 17 are used for matching the refractive index, and the refractive index and thickness of the refractive-index matching layer 15a are adjusted to achieve the purpose of matching the refractive index. Moreover, the refractive-index matching layer 15a also can be a single-layer or multi-layer structure, and the illustration thereof can be comprehended by referring to the above embodiment and is therefore omitted here for conciseness.

Figure 1D:
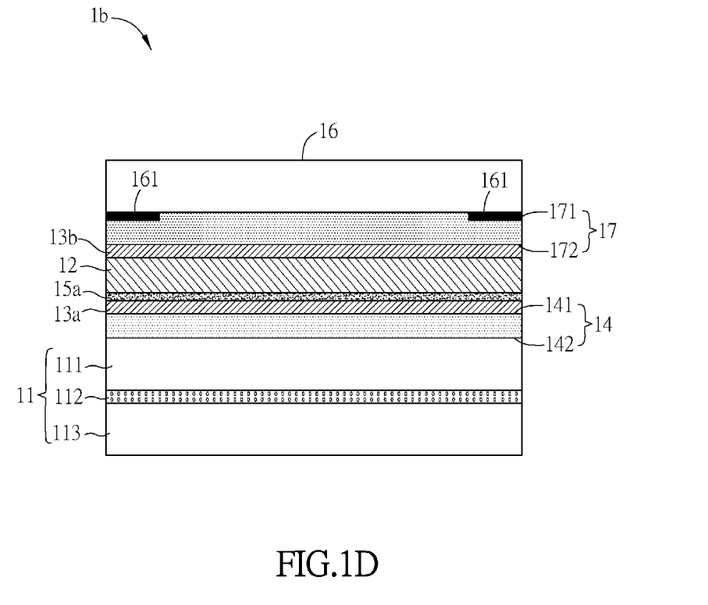
FIG. 1D is a schematic sectional diagram of another touch display device in accordance with one embodiment of the disclosure.

FIG. 1D is a schematic sectional diagram of another touch display device in accordance with various embodiments of the disclosure. As shown in FIG. 1D, the patterned electrode of the touch display device 1b is a double-layer separation structure. Particularly, the touch display device 1b includes a first patterned electrode layer 13a and a second patterned electrode layer 13b. The first patterned electrode layer 13a is disposed on the polarizer 12 and between the polarizer 12 and the display module 11. The second patterned electrode layer 13b is disposed on the polarizer 12 and between the protection substrate 16 and the polarizer 12 and crosses the first patterned electrode layer 13a. In other words, the first patterned electrode layer 13a and the second patterned electrode layer 13b are disposed on the opposite sides of the polarizer 12.

Furthermore, the first patterned electrode layer 13a includes the touch electrode of the first axial direction, and the second patterned electrode layer 13b includes the touch electrode of the second axial direction which crosses the first axial direction, for example, perpendicularly.

The illustration of other elements can be comprehended by referring to the above illustration and is therefore omitted here for conciseness.

To be noted, although the refractive-index matching layer 15a is disposed between the first patterned electrode layer 13a and the polarizer 12, it also can be disposed between the second patterned electrode layer 13b and the polarizer 12 in other embodiments, and thereby the refractive-index matching effect between the patterned portion and non-patterned portion (referring to the patterned portion 131 and the non-patterned portion 132 shown in FIG. 1B) also can be achieved.

Figure 2A:
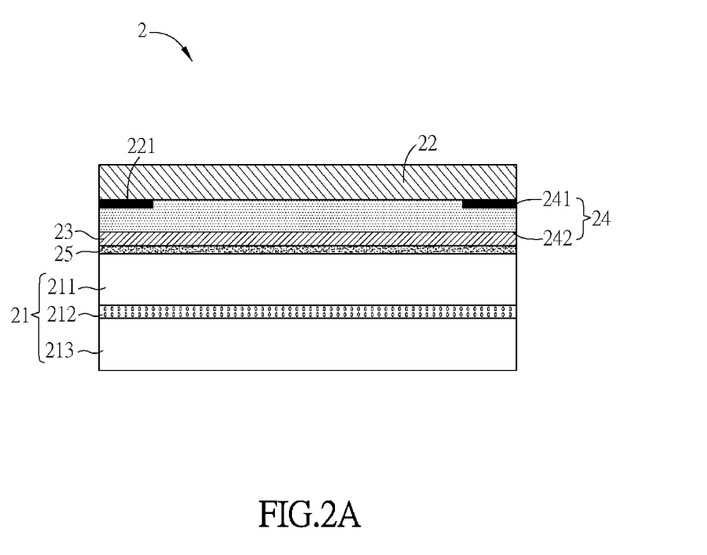
FIG. 2A is a schematic sectional diagram of a touch display device in accordance with one embodiment of the disclosure.

FIG. 2A is a schematic sectional diagram of a touch display device in accordance with various embodiments of the disclosure. As shown in FIG. 2A, the touch display device 2 includes the display module 21, the polarizer 22, the first patterned electrode layer 23 and the first transparent adhesive layer 24. The first patterned electrode layer 23 is disposed between the polarizer 22 and the display module 21. The first transparent adhesive layer 24 is disposed on the first patterned electrode layer 23. In this embodiment, the first transparent adhesive layer 24 is disposed the polarizer 22 and the first patterned electrode layer 23.

The display module 21 includes the substrate 211, the liquid crystal layer 212 and the TFT substrate 213. Herein, the liquid crystal layer 212 is disposed between the substrate 211 and the TFT substrate 213. The first patterned electrode layer 23 is directly formed on the side of the substrate 211 away from the TFT substrate 213 and is formed by deposition, exposure, development, etching or the like. Furthermore, the first patterned electrode layer 23 includes the uniaxial touch electrode (such as a comb-shaped electrode) or biaxial touch electrode (such as two axial electrodes crossing each other). Herein for example, the polarizer 22 is attached to the display module 21 by the first transparent adhesive layer 24.

The first transparent adhesive layer 24 has a first surface 241 and a second surface 242 which are disposed oppositely. The first surface 241 faces the polarizer 22 and the second surface 242 faces the first patterned electrode layer 23. The refractive index of the second surface 242 is greater than that of the first surface 241, and the stickiness of the first surface 241 is greater than that of the second surface 242. In other words, the higher refractive index of the second surface 242 of the first transparent adhesive layer 24 reduces the visibility of the patterned portion (referring to the patterned portion 131 in FIG. 1B) of the first patterned electrode layer 23, and the higher stickiness of the first surface 241 aids connection of the polarizer 22 and display module 21. The thickness of the first transparent adhesive layer 24 is in a range between 150 µm and 200 µm, and thereby, the disposition of the first transparent adhesive layer 24 between the polarizer 22 and the display module 21 can not only connect the polarizer 22 with the display module 21 but also reduce the visibility of the patterned portion 231.

In some embodiments, the touch display device 2 further includes a refractive-index matching layer 25 which is disposed between the display module 21 and the first patterned electrode layer 23 and disposed, for example, between the substrate 211 and the first patterned electrode layer 23. Likewise, the refractive-index matching layer 25 is a single-layer or multi-layer structure. Besides, the refractive index and thickness of the refractive-index matching layer 25 is adjusted according to the refractive index (N value) and extinction coefficient (K value) of the first patterned electrode layer 23 and the refractive index and thickness of the first transparent adhesive layer 24, so as to further reduce the visibility of the patterned portion (referring to the patterned portion 131 in FIG. 1B). The related illustration can be comprehended by referring to the first embodiment and is therefore omitted here for conciseness.

Moreover, the covering layer 221 is disposed on the polarizer 22 and in the peripheral region of the polarizer 22. The covering layer 221 covers the wires (not shown) connecting the first patterned electrode layer 23, or covers the circuit board (not shown), or covers other electronic elements. Herein for example, the covering layer 221 includes the light-blocking material of higher optical density, such as ink, photoresist material or their combination.

Figure 2B:
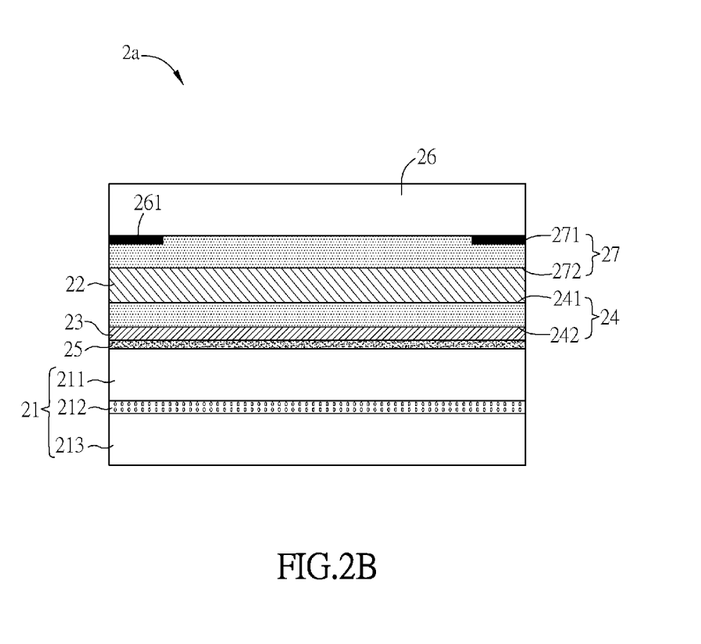
FIG. 2B is a schematic sectional diagram of another touch display device in accordance with one embodiment of the disclosure.

FIG. 2B is a schematic sectional diagram of another touch display device in accordance with various embodiments of the disclosure. As shown in FIG. 2B, the touch display device 2a further includes a protection substrate 26 which is disposed on the side of the polarizer 22 away from the display module 21, i.e. the top of the polarizer 12. The protection substrate 26 can be a glass substrate, plastic substrate or sapphire substrate. The protection substrate 26 possesses the transparence and can prevent the inner structure of touch display device 2a from being damaged when the user presses the touch display device 2a. Besides, some functional layers, such as an anti-glare layer, anti-fingerprint layer or anti-reflection layer, can be disposed on the protection substrate 26.

A second transparent adhesive layer 27 is disposed between the protection substrate 26 and the polarizer 22. The protection substrate 26 is attached to the polarizer 22 by the second transparent adhesive layer 27. The second transparent adhesive layer 27 is a transparent optical adhesive, such as OCA, mainly for the connection of the protection substrate 26 and polarizer 22.

In some embodiments, the second transparent adhesive layer 27 uses the same material as the first transparent adhesive layer 24, and the refractive index thereof is greater than or equal to 1.65 and less than or equal to 1.72 to further reduce the difference of the reflectivity between the patterned portion and the non-patterned portion (referring to the patterned portion 131 and non-patterned portion 132 in FIG. 1B). Particularly, the second transparent adhesive layer 27 has a third surface 271 and a fourth surface 272 which are disposed oppositely. The third surface 271 faces the protection substrate 26 and the fourth surface 272 faces the polarizer 22. The refractive index of the fourth surface 272 is greater than that of the third surface 271, and the stickiness of the third surface 271 is greater than that of the fourth surface 272. Likewise, the higher refractive index of the fourth surface 272 of the second transparent adhesive layer 27 reduces the visibility of the patterned portion 231 of the first patterned electrode layer 23, and the higher stickiness of the third surface 271 aids connection of the protection substrate 26 and polarizer 22. Moreover, the refractive index and features of the second transparent adhesive layer 27 can be comprehended by referring to the above embodiment and therefore the related illustration is omitted here for conciseness.

In some embodiments, at least a covering layer 261 is disposed on the protection substrate 26 and in the peripheral region of the protection substrate 26. The covering layer 261 covers the wires (not shown) connecting the first patterned electrode layer 23, or covers the circuit board (not shown), or covers other electronic elements. Herein for example, the covering, layer 261 includes the light-blocking material of higher optical density, such as ink, photoresist material or their combination.

The refractive-index matching layer 25 of this embodiment can be comprehended by referring to the above second embodiment and the related illustration is thus omitted here for conciseness.

Summarily, in the touch display device of this disclosure, the patterned electrode layer is integrated with the display panel so that an additional glass substrate for carrying the patterned electrode layer can be omitted and the entire thickness of the touch display device can be reduced. Besides, the polarizer and the display module are attached together by the first transparent adhesive layer of high refractive index. Accordingly, the first transparent adhesive layer not only can provide the adhesion effect, but also can make the electrode pattern of the touch display device less visible or even invisible by its particular high refractive index. Therefore, the appearance effect of the touch display device can be improved, and besides, the multi-layer optical film (or a plurality of optical films) of the conventional art can be reduced so that the touch display device can be made lighter and thinner and the manufacturing method can be simplified.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A touch display device, comprising:
   a display module;
   a polarizer;
   a first patterned electrode layer disposed between the polarizer and the display module and including a patterned portion and a non-patterned portion; and
   a first transparent adhesive layer disposed on the first patterned electrode layer, wherein the refractive index of the first transparent adhesive layer is greater than or equal to 1.65 and less than or equal to 1.72;
   wherein the first transparent adhesive layer is disposed between the polarizer and the first patterned electrode layer, wherein the first transparent adhesive layer has a first surface and a second surface which are disposed oppositely, the first surface faces the polarizer and the second surface faces the first patterned electrode layer, the refractive index of the second surface is greater than that of the first surface, and the stickiness of the first surface is greater than that of the second surface;
   wherein reflectivity of the patterned portion is substantially the same as reflectivity of the non-patterned portion.

2. The touch display device of claim 1, further comprising:
   a refractive-index matching layer disposed between the display module and the first patterned electrode layer.

3. The touch display device of claim 1, wherein at least a covering layer is disposed on the polarizer and in a peripheral region of the polarizer.

4. The touch display device of claim 1, further comprising:
   a protection substrate disposed on the side of the polarizer away from the display module.

5. The touch display device of claim 4, wherein a second transparent adhesive layer is disposed between the protection substrate and the polarizer.

6. The touch display device of claim 5, wherein the second transparent adhesive layer has a third surface and a fourth surface which are disposed oppositely, the third surface faces the protection substrate and the fourth surface faces the polarizer, the refractive index of the fourth surface is greater than that of the third surface, and the stickiness of the third surface is greater than that of the fourth surface.

7. The touch display device of claim 4, wherein at least a covering layer is disposed on the protection substrate and in a peripheral region of the protection substrate.

8. The touch display device of claim 1, wherein the thickness of the first transparent adhesive layer is in a range between 150 μm and 200 μm.

9. The touch display device of claim 4, further comprising:
- a second patterned electrode layer disposed on the polarizer and between the protection substrate and the polarizer, and crossing the first patterned electrode layer.

10. A touch display device, comprising:
- a display module;
- a polarizer;
- a first patterned electrode layer disposed between the polarizer and the display module and including a patterned portion and a non-patterned portion;
- a first transparent adhesive layer disposed on the first patterned electrode layer, wherein the refractive index of the first transparent adhesive layer is greater than or equal to 1.65 and less than or equal to 1.72; and
- a protection substrate disposed on the side of the polarizer away from the display module;
- a second transparent adhesive layer disposed between the protection substrate and the polarizer, wherein the second transparent adhesive layer has a third surface and a fourth surface which are disposed oppositely, the third surface faces the protection substrate and the fourth surface faces the polarizer, the refractive index of the third surface is greater than that of the fourth surface, and the stickiness of the third surface is greater than that of the fourth surface;
- wherein reflectivity of the patterned portion is substantially the same as reflectivity of the non-patterned portion.

11. The touch display device of claim 10, wherein the first transparent adhesive layer is disposed between the first patterned electrode layer and the display module.

12. The touch display device of claim 11, wherein the first transparent adhesive layer has a first surface and a second surface which are disposed oppositely, the first surface faces the first patterned electrode layer and the second surface faces the display module, the refractive index of the first surface is greater than that of the second surface, and the stickiness of the second surface is greater than that of the first surface.

13. The touch display device of claim 11, further comprising:
- a refractive-index matching layer disposed between the polarizer and the first patterned electrode layer.

14. The touch display device of claim 10, wherein the first transparent adhesive layer is disposed between the polarizer and the first patterned electrode layer.

15. The touch display device of claim 14, wherein the first transparent adhesive layer has a first surface and a second surface which are disposed oppositely, the first surface faces the polarizer and the second surface faces the first patterned electrode layer, the refractive index of the second surface is greater than that of the first surface, and the stickiness of the first surface is greater than that of the second surface.

16. The touch display device of claim 14, further comprising:
- a refractive-index matching layer disposed between the display module and the first patterned electrode layer.

17. The touch display device of claim 10, wherein at least a covering layer is disposed on the polarizer and in a peripheral region of the polarizer.

18. The touch display device of claim 10, wherein at least a covering layer is disposed on the protection substrate and in a peripheral region of the protection substrate.

19. The touch display device of claim 10, wherein the thickness of the first transparent adhesive layer is in a range between 150 μm and 200 μm.

20. The touch display device of claim 10, further comprising:
- a second patterned electrode layer disposed on the polarizer and between the protection substrate and the polarizer, and crossing the first patterned electrode layer.

* * * * *